United States Patent
Lian

(10) Patent No.: US 6,669,033 B1
(45) Date of Patent: Dec. 30, 2003

(54) SUCTION-TYPE RACK

(76) Inventor: Bing-Tson Lian, 79 Fan Sir St., Fan Sir Village, Fu Hsin Hsiang, Chang Hua Hsien (TW)

( * ) Notice: Subject to any disclaimer, the term of this patent is extended or adjusted under 35 U.S.C. 154(b) by 0 days.

(21) Appl. No.: 10/160,080

(22) Filed: Jun. 3, 2002

(51) Int. Cl.[7] .................................................... A47F 7/00
(52) U.S. Cl. .................. 211/87.01; 211/106; 248/206.2; D6/537; D6/540
(58) Field of Search ........................... 211/87.01, 88.01, 211/106; 248/205.8, 206.2, 206.3, 206.4; D6/532, 537, 540

(56) References Cited

U.S. PATENT DOCUMENTS

| | | | | |
|---|---|---|---|---|
| 952,495 | A | * | 3/1910 | Austin |
| 2,568,714 | A | * | 9/1951 | Britton |
| 2,940,713 | A | * | 6/1960 | Van Dusen |
| 4,133,575 | A | * | 1/1979 | Mader |
| 4,361,116 | A | * | 11/1982 | Kilham |
| 5,087,005 | A | * | 2/1992 | Holoff et al. ............ 248/205.8 |
| 6,193,197 | B1 | * | 2/2001 | Lian ........................ 248/206.2 |
| 6,478,271 | B1 | * | 11/2002 | Mulholland .............. 248/205.8 |
| 6,502,794 | B1 | * | 1/2003 | Ting ........................ 248/206.2 |

* cited by examiner

*Primary Examiner*—Robert W. Gibson, Jr.
(74) *Attorney, Agent, or Firm*—Harrison & Egbert

(57) ABSTRACT

A suction-type rack includes a suction cup, a cover, a tightening knob, and an article-holding frame. The article-holding frame is provided with a fastening portion which is fastened to a threaded rod of the suction cup by the tightening knob. The threaded rod of the suction cup is engaged with the tightening knob via a through hole of the cover. The fastening portion of the article-holding frame is located between the cover and the tightening knob such that a locating projection of the fastening portion is securely retained in a locating slot of the cover.

2 Claims, 5 Drawing Sheets

SUCTION-TYPE RACK

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a rack for holding articles, and more particularly to a suction-type rack.

BACKGROUND OF THE INVENTION

As shown in FIGS. 1 and 2, a suction-type rack of the prior art comprises a suction cup 10, a cover 20, a tightening knob 30, and an article-holding frame 40. The suction cup 10 is provided in the outer side with a threaded rod 11 extending therefrom. The cover 20 is attached to the outer side of the suction cup 10 such that the threaded rod 11 of the suction cup 10 is extended out of the center hole of the cover 20. The article-holding frame 40 is provided with a fastening end 41 and is fastened with the threaded rod 11 of the suction cup 10 by the tightening knob 30 in conjunction with a spring 12 which is fitted over the threaded rod 11. The fastening end 41 is fitted over the threaded rod 11 and is fastened by the tightening knob 30.

Such a prior art suction-type rack as described above is defective in design [in that] because the fastening end 41 of the article-holding frame 40 is not located securely on the threaded rod 11, and because the article-holding frame 40 is susceptible to sideway movement by an external force, as illustrated in FIG. 2.

BRIEF SUMMARY OF THE INVENTION

The primary objective of the present invention is to provide a suction-type rack which is free of the deficiency of the prior art suction-type rack described above.

In keeping with the principle of the present invention, the foregoing objective of the present invention is attained by the suction-type rack comprising a suction cup, a cover, a tightening knob, and an article-holding frame. The present invention is characterized by the cover which is provided in the outer side with a locating slot, and by the article-holding frame which is provided at the fastening portion thereof with a locating projection. The fastening portion of the article-holding frame is fastened with a threaded rod of the suction cup in conjunction with the tightening knob such that the locating projection of the fastening portion of the article-holding frame is retained in the locating slot of the cover, so as to locate securely the article-holding frame.

The features and the advantages of the present invention will be more readily understood upon a thoughtful deliberation of the following detailed description of the present invention with reference to the accompanying drawings.

DETAILED DESCRIPTION OF THE INVENTION

Figure 1:
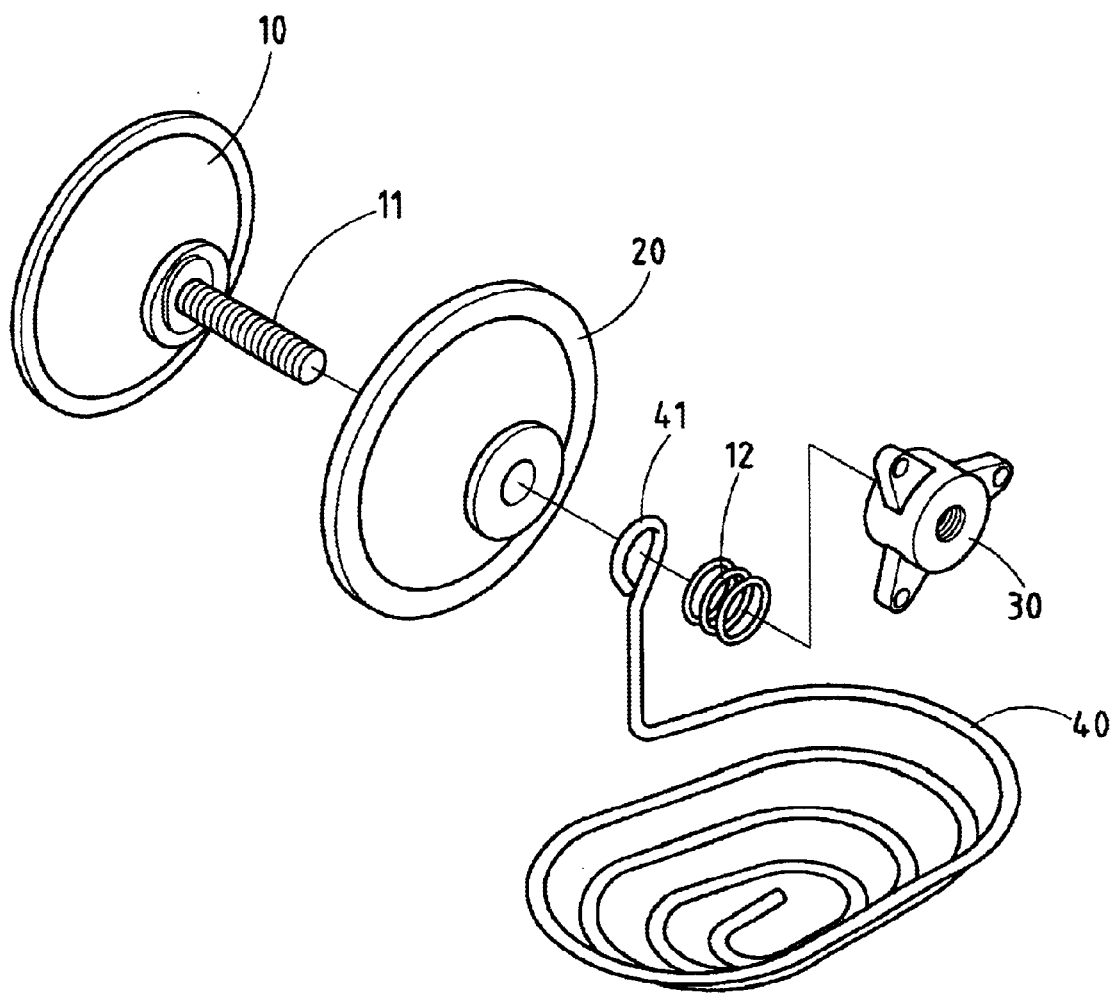
FIG. 1 shows an exploded perspective view of a suction-type rack of prior art.
Figure 2:
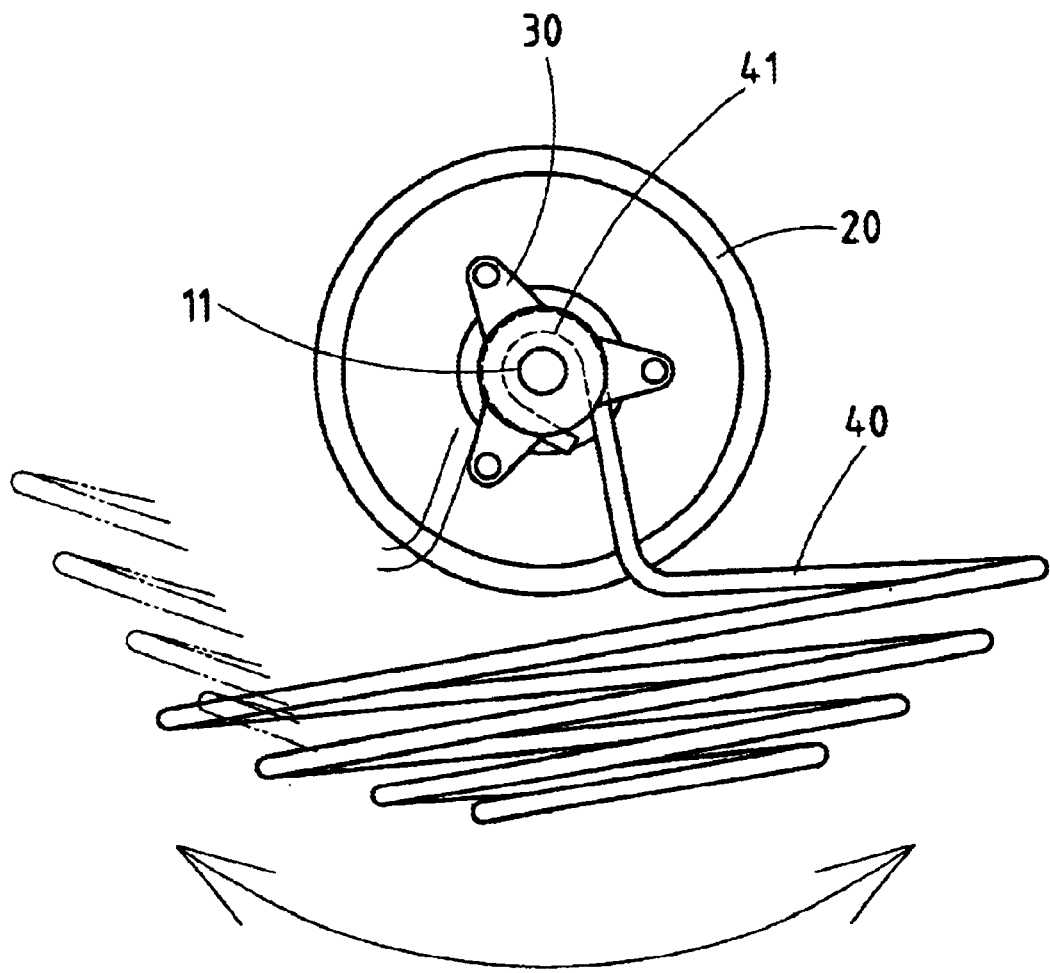
FIG. 2 shows a schematic view of the prior art suction-type rack in use.
Figure 3:
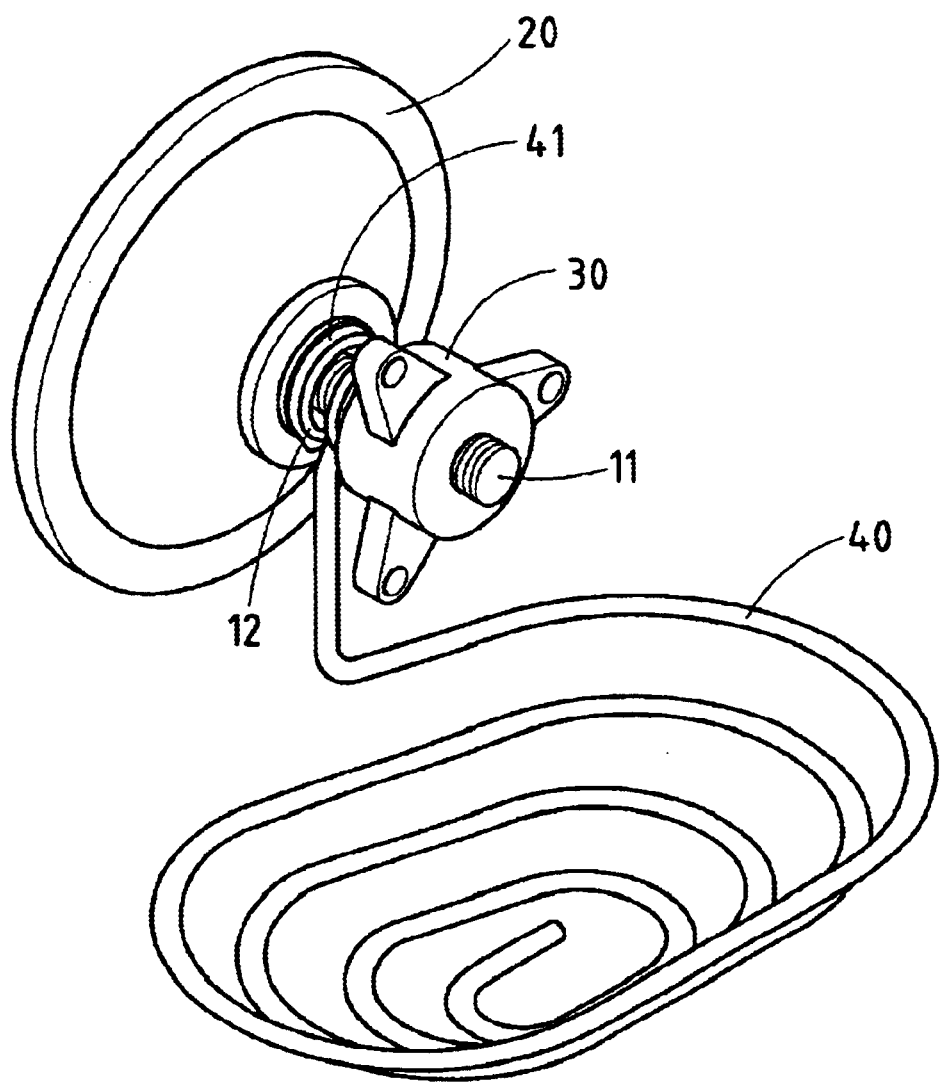
FIG. 3 shows an perspective view of the present invention.
Figure 4:
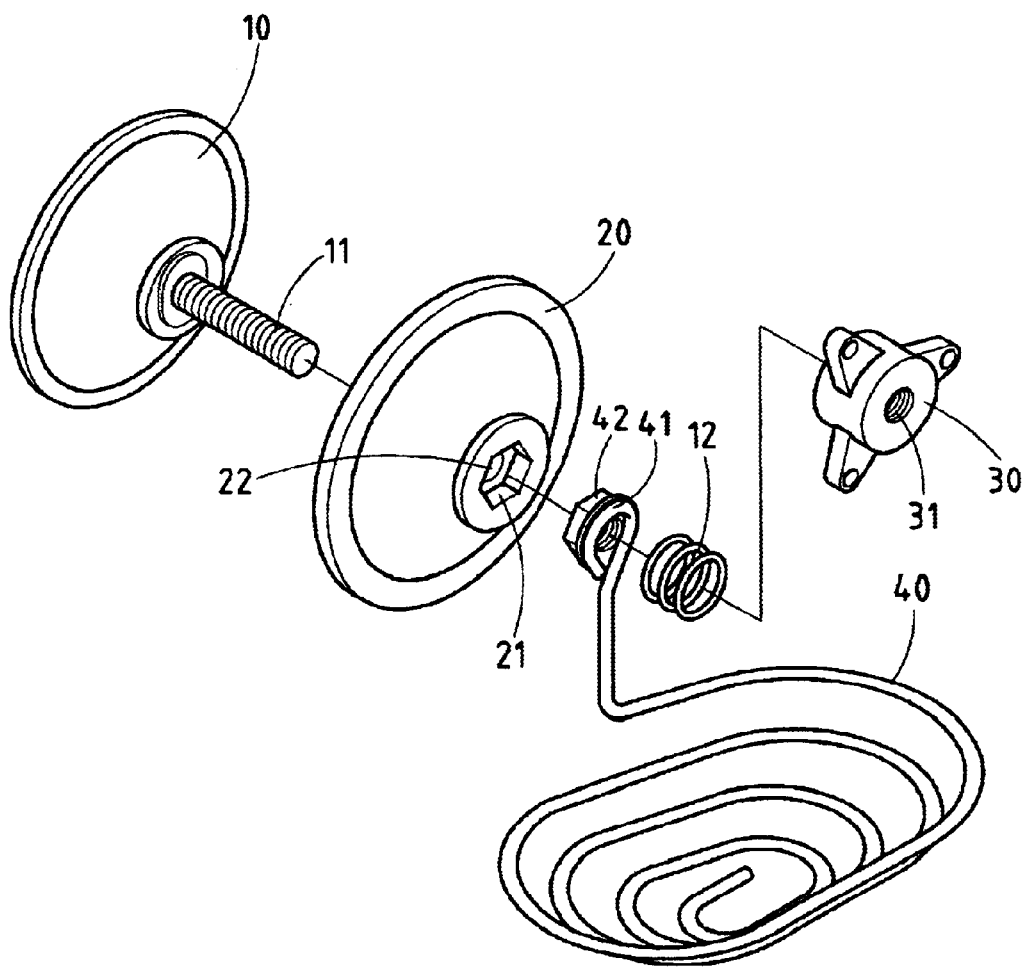
FIG. 4 shows an exploded perspective view of the present invention.
Figure 5:
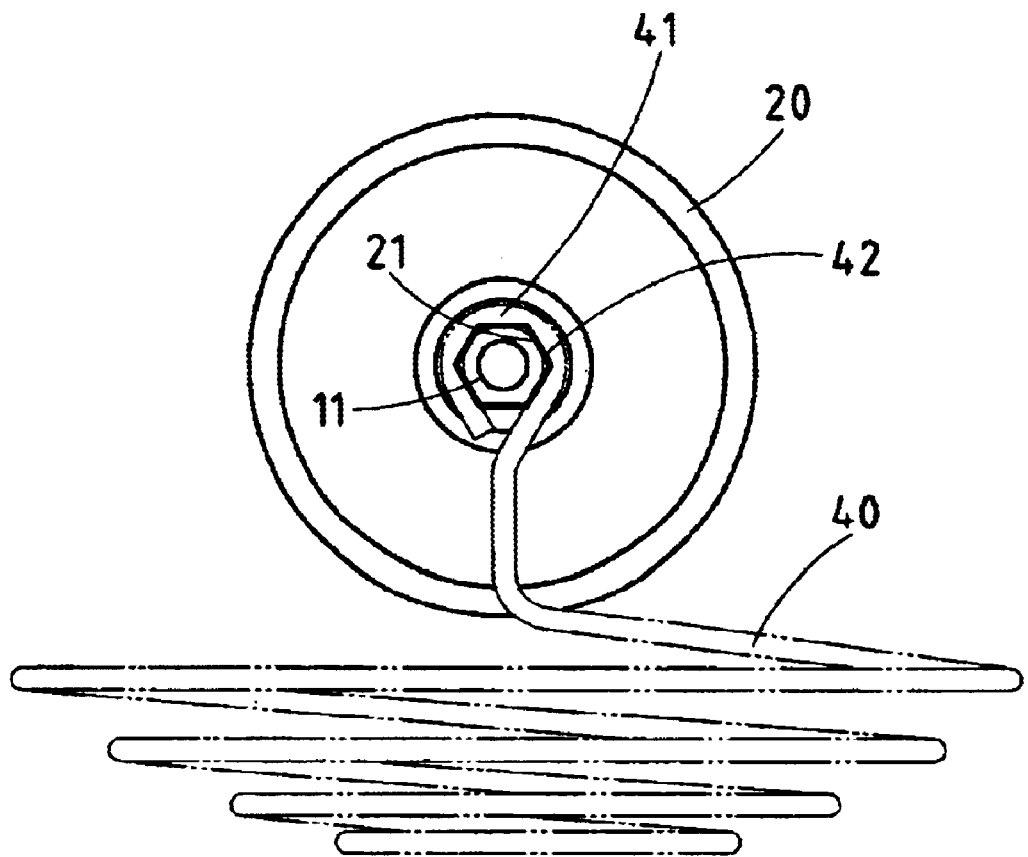
FIG. 5 is a plan view showing that the fastening end of the article-holding frame is securely located by the locating projection which is retained in the locating slot of the cover of the present invention.

As shown in FIGS. 3, 4, and 5, a suction-type rack of the present invention comprises a suction cup 10, a cover 20, a tightening knob 30, and an article-holding frame 40.

The suction cup 10 is provided in the outer side with a threaded rod 11 of a predetermined length and is capable of sticking to a surface by creating a vacuum in the area it covers.

The cover 20 is provided in the center with a through hole 22 corresponding in location to the threaded rod 11 of the suction cup 10. The cover 20 is fitted with the outer side of the suction cup 10 such that the threaded rod 11 of the suction cup 10 is extended through the through hole 22 of the cover 20.

The tightening knob 30 is provided with a threaded through hole 31 engageable with the threaded rod 11 of the suction cup 10.

The article-holding frame 40 is provided with a fastening end 41 by which the article-holding frame 40 is fastened with the threaded rod 11 of the suction cup 10 by the tightening knob 30 in conjunction with a spring 12, which is fitted over the threaded rod 11 and is located between the fastening end 41 and the tightening knob 30 whose threaded through hole 31 is engaged with the threaded rod 11 of the suction cup 10.

The present invention is characterized by the cover 20 which is provided at the outer end of the through hole 22 thereof with a locating slot 21. The present invention is further characterized by the article-holding frame 40 which is provided at the fastening end 41 thereof with a locating projection 42 corresponding in shape to the locating slot 21. The fastening end 41 of the article-holding frame 40 is fastened with the threaded rod 11 of—the suction cup 10 such that the locating projection 42 of the fastening end 41 is retained in the locating slot 21 of the cover 20 so as to locate securely the article-holding frame 40. As a result, the article-holding frame 40 is prevented from moving sideways when it is exerted on by an external force. The article-holding frame 40 of the present invention is therefore not vulnerable to being loosened, thanks to the joint effort of the locating slot 21 and the locating projection 42.

As shown in FIGS. 4 and 5, the locating slot 21 of the cover 20 is hexagonal. Accordingly, the locating projection 42 of the article-holding frame 40 has a hexagonal form.

The present invention described above is to be regarded in all respects as being merely illustrative and not restrictive. Accordingly, the present invention may be embodied in other specific forms without deviating from the spirit thereof The present invention is therefore to be limited only by the scope of the following claims.

I claim:

1. A suction-type rack apparatus comprising:
   a suction cup having a threaded rod extending outwardly from an outer side thereof;

a cover having a through hole formed therein, said cover fitted over said outer side of said suction cup, said threaded rod extending through said through hole of said cover, said cover having a locating slot formed at an outer end of said through hole, said locating slot having a polygonal shape;

a tightening knob having a threaded through hole, said threaded through hole of said tightening knob threadedly engaged with said threaded rod of said suction cup;

an article-holding frame having a fastening portion extending therefrom, said fastening portion secured around said threaded rod of said suction cup by said tightening knob, said fastening portion of said article-holding frame having a locating projection affixed to one side of said fastening portion and retained within said locating slot of said cover, said locating projection having a polygonal shape corresponding to the polygonal shape of said locating slot; and a spring resiliently interposed between said tightening knob and an opposite side of said fastening portion opposite said locating projection.

2. The apparatus of claim 1, the polygonal shape of said locating slot and said locating projection being of hexagonal shape.

* * * * *